United States Patent
Moelkner et al.

(10) Patent No.: US 7,040,172 B2
(45) Date of Patent: May 9, 2006

(54) MICROMECHANICAL HIGH-PRESSURE SENSOR

(75) Inventors: Thomas Moelkner, Stuttgart (DE); Ralf Henn, Gomaringen (DE); Werner Steiner, Boeblingen (DE); Hans-Peter Didra, Kusterdingen-Jettenburg (DE); Philip Cutuli, Reutlingen (DE); Frank Klopf, Waldbuettelbrunn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/059,229

(22) Filed: Feb. 16, 2005

(65) Prior Publication Data

US 2005/0188769 A1    Sep. 1, 2005

(30) Foreign Application Priority Data

Feb. 17, 2004 (DE) ............... 10 2004 007 518
Oct. 20, 2004 (DE) ............... 10 2004 050 983

(51) Int. Cl.
*G01L 7/00* (2006.01)

(52) U.S. Cl. ...................................................... 73/706
(58) Field of Classification Search ............... 73/706, 73/708, 715–728, 754, 756; 29/25.01, 25.02, 29/25.03, 25.35; 338/2, 3, 4, 5
See application file for complete search history.

(56) References Cited

U.S. PATENT DOCUMENTS 4,628,296 A * 12/1986 Kitagawa et al. ............. 338/3
4,630,491 A * 12/1986 Kitagawa et al. ...... 73/862.622
4,876,893 A * 10/1989 Kato et al. ................... 73/726
5,508,676 A * 4/1996 Grange et al. ................ 338/2

FOREIGN PATENT DOCUMENTS

DE    103 37 571    10/2004

OTHER PUBLICATIONS

Brückner et al., Journal of Applied Physics, Mar. 1, 2000, vol. 87, No. 5, p. 2219 ff.
Wang et al., "Power Dissipation of Embedded Resistors", IPC Printed Circuits Expo 2003, Long Beach, CA, Mar. 23-27, 2003, 6 pgs.

* cited by examiner

*Primary Examiner*—William Oen
(74) *Attorney, Agent, or Firm*—Kenyon & Kenyon, LLP

(57) ABSTRACT

A micromechanical pressure sensor and a method for producing a micromechanical pressure sensor. This pressure sensor has at least one membrane and a measuring element situated on the membrane. A pressure applied at the membrane or a pressure differential applied at the different sides of the membrane results in deformation of the membrane. Simultaneous with the deformation of the membrane, the measuring element is subjected to elastic elongation and/or compression. In a piezo-sensitive component, such elastic elongation and/or compression generates a measured variable in the measuring element, which represents the applied pressure or the applied pressure differential at the membrane. It is provided in this context that the measuring element have at least partially a NiCr(Si) layer. Due to an at least partial crystallization in the production of the micromechanical pressure sensor, this NiCr(Si) layer has more advantageous piezoelectrical characteristics than an amorphous NiCr(Si) layer.

10 Claims, 1 Drawing Sheet

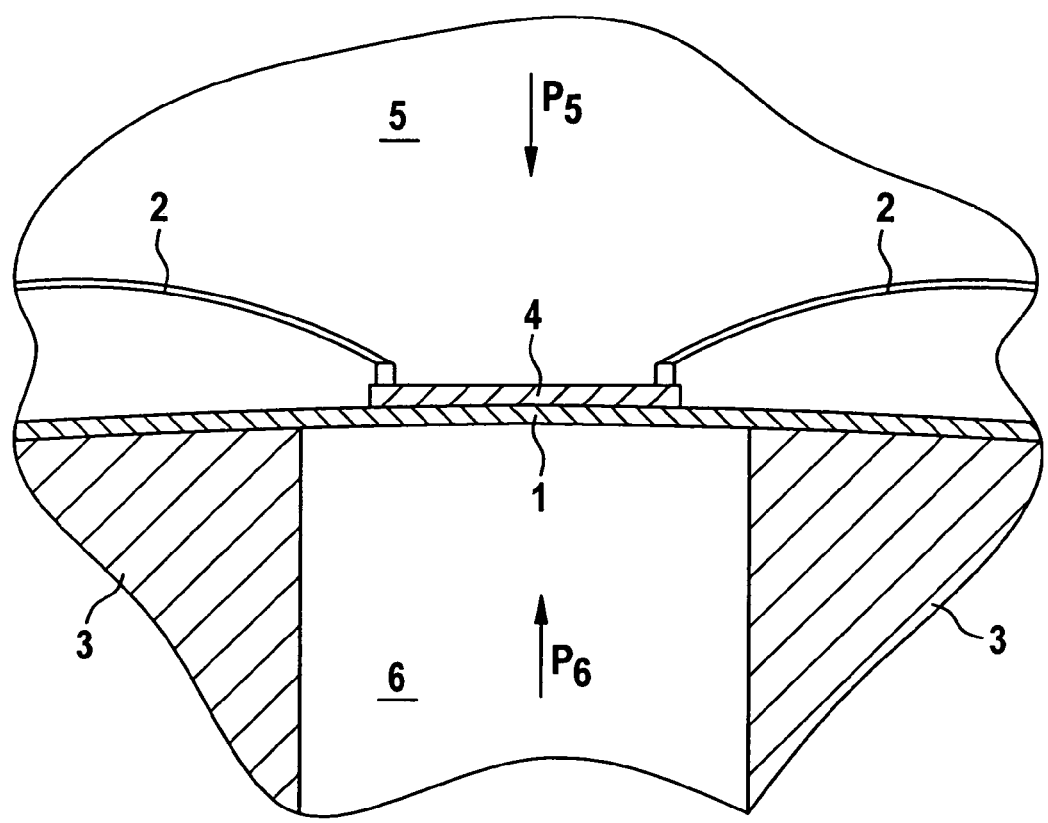

MICROMECHANICAL HIGH-PRESSURE SENSOR

FIELD OF THE INVENTION

The present invention is based on a method and a device for producing a micromechanical pressure sensor.

BACKGROUND INFORMATION

High-pressure sensors are utilized in many systems such as in automation technology and in the automotive field. In the automotive field, the high-pressure sensors are used in gasoline-direct injection, common rail diesel-direct injection, electronic stability programs and in electro-hydraulic brakes, among others.

In addition to capacitive measuring methods for pressure sensors, piezoresistive methods are known where, for instance, metal resistors are interconnected in the form of a Wheatstone bridge on a suitably designed steel membrane. Elastic elongation or compression of the resistors produces detuning of the bridge, the detuning generating a measured variable which represents the applied pressure. In applications in the motor vehicle field, for instance, such high-pressure sensors are required to have high sensitivity, i.e., the highest possible change in resistance in response to occurring mechanical deformations (high k factor). Furthermore, the high-pressure sensors must exhibit high temperature stability from at least −40° C. to +140° C. so as to be suitable for use in different regions of the motor vehicle. In addition, the highest possible stability must be achieved over the service life of the sensor, a period of approximately ten years being provided in motor vehicle applications. Moreover, in special applications such as detection of the combustion-chamber pressure, even higher temperature resistances of up to approximately 400° C. are demanded.

From the U.S. Pat. No. 4,876,893, a pressure sensor is already known which has a resistance layer for measuring the pressure, this layer being made of nickel, chromium and silicon. In the not prepublished-document German Patent Application No. 103 14 770, the production of a piezo-sensitive pressure sensor is described where the piezoelectrical properties of a resistance layer are improved by suitable environmental conditions.

A description of the partial crystallization of an NiCr(Si) layer has been provided by Bruckner et al. in the Journal of Applied Physics, vol. 87, no. 5, on page 2219 ff. In sensors that have NiCr(Si) layers, an offset drift may be encountered in an electrostatic discharge (ESD). This noticeable vulnerability of the measuring accuracy in sensors of this type constitutes an intrinsic characteristic of the utilized resistance layer, as it is described, for instance, by Wang et al. in "Power Dissipation of Embedded Resistors" in IPC Printed Circuits Expo 2003.

SUMMARY OF THE INVENTION

The present invention is based on a micromechanical pressure sensor and a method for producing a micromechanical pressure sensor. This pressure sensor has at least one membrane and a measuring element situated on the membrane. A pressure applied at the membrane or a pressure differential applied at the different sides of the membrane results in deformation of the membrane. Simultaneously with the deformation of the membrane, the measuring element is subjected to elastic elongation and/or compression. In a piezo-sensitive component, such an elastic elongation and/or compression generates a measured variable in the measuring element, which represents the applied pressure or the applied pressure differential at the membrane. It is provided in this context that the measuring element have a NiCr(Si) layer, at least partially. This NiCr(Si) layer has more advantageous piezoelectrical characteristics than an amorphous NiCr(Si) layer, as a result of an at least partial crystallization in the production of the micromechanical pressure sensor.

The at least partial crystallization causes the pressure sensor to become more stable with respect to environmental influences. For instance, the pressure sensor may be used in temperatures of up to 400° C.

In a further refinement of the present invention, the measuring element is deposited on a steel substrate, it being provided, in particular, that the steel substrate include the membrane of the pressure sensor. Furthermore, it is provided that an insulating layer be deposited on the steel membrane for the purpose of insulating the piezo-sensitive component in the measuring element from the electrically conductive steel membrane. An amorphous NiCr(Si) layer, in particular, is deposited subsequently. The NiCr(Si) layer is patterned in an appropriate manner for later use as piezoelectric resistance layer. Furthermore, at least one annealing step is provided in the manufacture of the micromechanical pressure sensor, which may be carried out for artificial ageing of the resistance layer, for instance, or in connection with the patterning.

The crystallization of the NiCr(Si) layer advantageously occurs during an annealing step. Both a complete crystallization of the NiCr(Si) layer and only partial crystallization may be provided in this context. The degree of crystallization is able to be controlled via the annealing temperature or the annealing time, for instance. Instead of an additional annealing step, the annealing step for the crystallization may also be linked to an annealing step during the ageing or patterning.

In an embodiment of the present invention, an $SiO_x$ layer as insulating layer is deposited on the steel membrane. Furthermore, it may be provided that the NiCr(Si) layer be deposited in a sputtering process. In an advantageous manner, a photochemical method in which the NiCr(Si) layer is masked by a photo layer has proven useful as conventional method for the patterning. Ageing of the measuring element or the entire micromechanical pressure sensor has shown to be advantageous as well.

During at least one annealing step, the measuring element, for instance, undergoes a thermal treatment, which simulates artificial ageing. This ageing process stabilizes the measuring element or the pressure sensor with respect to environmental influences.

In an advantageous manner, the measuring element is at least partially made up of resistance layers. It is provided that one or a plurality of the, in particular, metallic resistance layers be deposited on the membrane or on an insulating layer with the aid of a sputtering process. The contacting of the resistance layers, which are embodied as strain gauges, occurs via a special contact layer or a corresponding layer system such as NiCr/Pd/Au or Ni, for instance. In addition, however, it may be provided that locally restricted contact points, which allow an electrical transmission of the acquired measured variable, be present only at certain locations on the resistance layer. With the aid of a passivating layer, for instance an $Si_xN_y$ layer, the resistance layer or the entire layer system is protected from external influences. Due to the high sensitivity of the measuring bridge in the resistance layer, a complete covering by the passivation is present in order to ensure fault-free operation of the sensor element.

In a preferred embodiment of the present invention, the pressure sensor, the resistance layer and/or the NiCr(Si) layer are/is subjected to an annealing step at a temperature of more than 350° C. It is provided here, in particular, that a partial crystallization of the NiCr(Si) layer take place at a temperature of between 350 and 450° C. The annealing step above 350 ° C., which is required for partial crystallization, may be carried out at different times during the production of the micromechanical pressure sensor. For example, it is conceivable to implement the required annealing step already after patterning of the NiCr(Si) layer in a first ageing step. However, in an alternative embodiment of the present invention, it is also possible to implement the crystallization at the end of the thin-layer process in a second ageing step. In the process, stabilization of the entire layer system is able to be obtained through the annealing step. Another advantage of annealing the entire layer system at the high temperature is that the pressure sensor will be prepared for use under extreme temperature conditions. It is conceivable, for instance, to use a micromechanical pressure sensor stabilized in this manner for applications in the combustion chamber of a motor vehicle.

Due to the crystallization or the partial crystallization, which begins to any noticeable extent only at a temperature of >350° C., the specific resistance of the resistance layer that includes the NiCr(Si) layer is able to be reduced by approximately 10% according to the present invention. In addition, an increase in the sensitivity with respect to the k factor of approximately 35% can be observed. Because of the increased sensitivity, fewer demands are therefore placed on the evaluation electronics. Furthermore, lower mechanical loading of the deformation body, i.e., the membrane, will be required to generate a measured variable representing the applied pressure. This allows an optimization of the configuration with respect to linearity and hysteresis, among others. As a result of the higher k factor, an increase in the membrane thickness may be achieved while the output signal remains unchanged. In this case, constant manufacturing tolerances will result in less variance of the sensor sensitivity in the membrane production.

The thermal treatment of the sensor at a temperature of >350° C. considerably extends the possible operating temperature of the sensor. Stable behavior at temperatures of up to just below 400° C. is conceivable, for instance. At the same time, the production method of a micromechanical pressure sensor according to the present invention is able to be carried out in a cost-effective manner since the described high-temperature annealing step may be realized as extension of a temperature step that is already part of a thin-layer process. As a result, there is also no impediment to the use in a large-scale manufacturing process.

In electrostatic loading (ESD discharge) of a sensor having a NiCr(Si) layer, offset drifts may be detected, which can be traced to a locally induced phase transformation in the NiCrSi. The phase transformation is attributable to the thermal influence in the occurrence of excessive current densities. When using an amorphous NiCrSi functional layer that has not been produced by the method according to the present invention, it will be assumed that a locally induced phase transformation, and thus the formation of the partially crystalline 350° C. phase, will occur in ESD loading. Using the present invention makes it possible to anticipate this phase transformation and thus to achieve greater stability of the sensor with respect to electrostatic discharges (ESD) since corresponding loadings may occur within the installation context, for instance. Typical values at which these electrical voltages may arise are on the order of 2 kV. As a result, due to the anticipated phase transformation, no local formation of the partially crystalline phase can occur in ESD loading of the component. This results in a much more stable response of the component in ESD loading. For example, the ESD-induced change in the bridge offset may decrease by nearly two orders of magnitude in a range of up to 2 kV.

BRIEF DESCRIPTION OF THE DRAWING

The FIGURE shows the schematic structure of a pressure sensor.

DETAILED DESCRIPTION

The FIGURE schematically illustrates the structure of a pressure sensor as it is produced in the present invention. A membrane 1 is mounted in a frame 3 in such a way that a gas volume 5 having pressure p5 is separated from a gas volume 6 having pressure p6. Membrane 1 may be made of the same material as the frame or it may be produced from a completely different material. No pressure equalization through membrane 1 is able to take place between gas volume 5 and gas volume 6. Located on membrane 1 is a resistance layer 4, which may be made of semiconducting or conducting materials. For evaluation of the measured variables that are detected by resistance layer 4, contactings 2 are affixed on the resistance layer, which allow the measured variables to be forwarded for analysis.

The method of functioning of the illustrated pressure sensor via resistance layer 4 will be explained briefly in the following.

In response to a pressure change on one side of membrane 1, for instance in volume 5, bulging of membrane 1 occurs. At the same time, resistance layer 4 follows the curvature of membrane 1 so that elongation or compression of resistance layer 4 takes place. By suitable selection of the materials from which resistance layer 4 is made, this elongation or stretching causes a change in resistance in resistance layer 4, so that the curvature of membrane 1 and thus the pressure change may be inferred by measuring the change in resistance. The use of a pressure sensor of the type described allows detection not only of absolute pressure changes in a volume 5 (given a fixed gas volume 6) but of relative pressure changes in volume 5 and 6 as well.

The application of a resistance layer 4 on a membrane 1 has already been described by various publications (among them, the U.S. Pat. No. 4,876,893 cited in the introduction), so that a detailed illustration of the entire production process may be omitted. Accordingly, only the process steps on which the present invention-is based will be sketched in the following.

In a preferred exemplary embodiment, an amorphous NiCr(Si) layer is deposited on the membrane in a sputtering process. In a patterning operation, a photoresist layer patterned by a photochemical method, for instance, is deposited on the NiCr(Si) layer and then exposed. By selective etching of the exposed photoresist layer, patterning of the NiCr(Si) layer is able to be realized. In a first stabilization or ageing step, the patterning thus achieved is annealed once the remaining photoresist has been removed. Typically, temperatures below 300° C., which do not lead to noticeable crystallization of the NiCr(Si) layer yet, are employed. However, by raising the temperature to 350 to 450° C., the desired crystallization may be achieved. Following this first annealing step, the contacting of the piezoresistive resistance layer thus produced may be implemented via a special contact layer, i.e., a corresponding layer system such as NiCr/Pd/Au or Ni or by local contact points on the resistance layer. The piezoresistive resistance layer may be adjusted by a pre-adjustment. Due to the removal or addition of material from or to the thin-layer film forming the resistance layer, the piezoelectric characteristics may vary within certain limits. For the purpose of protecting the produced layer system from external influences, especially environmental influences, a passivation layer is applied subsequently. To ensure fault-free operation of the measuring element or the sensor element (measuring element including membrane and insulating and/or passivating layers) it will be necessary to cover the resistance layer completely while sparing possible contact surfaces. A nitride layer, such as an $Si_xN_y$ layer, is typically applied as passivating layer. A second ageing step may finally be carried out at the end of the thin-layer process. This step stabilizes the complete layer system. As an alternative to the crystallization of the NiCr(Si) layer during the first ageing step, the crystallization, too, may therefore be implemented in the second ageing step. This would have the advantage of exposing the entire layer system to the high temperature, thereby stabilizing it in a more optimal manner with respect to external influences.

As is known from German Patent Application No. 103 14 770, the environmental conditions during the layer deposition additionally influence the layer characteristics of the deposited layer. For that reason, to optimize the layer characteristics, the crystallization transforms the amorphous NiCr(Si) layer into a bcc phase (body-centered cubic structure) having a grid constant of approximately 0.2866 nm, which is described in the literature (Bruckner et al., Journal of Applied Physics, vol. 87, no. 5, page 2219 ff) as $\alpha_{SS}(Cr)$.

In a further exemplary embodiment, it is possible to influence not only the temperature in the at least one annealing step or during the vacuum deposition process/sputtering process, but the composition of the atmosphere as well so as to modify the electrical characteristics of the resistance layer. For a possible consideration of suitable environmental conditions, reference is made to German Patent Application No. 103 14 770 in which a defined air supply (more precisely, a defined oxygen/nitrogen ratio) is provided during the sputtering process of the NiCr(Si) layer.

Suggested application areas for micromechanical pressure sensors according to the production method of the present invention are applications where extreme conditions prevail with respect to temperature or pressure since, due to the high annealing temperature, the pressure sensor is stabilized in extreme conditions.

Because of the elucidated phase transformation by thermal conditioning of the layer system at temperatures above 350° C., it is possible to produce a sensor which exhibits more stable behavior in electrostatic discharging (ESD loading), especially with respect to the offset. This is due to the fact that the phase transformation in the NiCr(Si) layer is practically anticipated by the electrostatic discharge.

What is claimed is:

1. A method for producing a micromechanical pressure sensor, comprising:
   providing a membrane;
   providing a measuring element on the membrane, the measuring element being capable of generating a measured variable by at least one of elastic elongation and compression representing at least one of a pressure applied at the membrane and a pressure differential applied at more than one side of the membrane;
   providing the measuring element at least partially with an NiCr(Si) layer; and
   at least partially crystallizing the NiCr(Si) layer.
2. The method as recited in claim 1, further comprising:
   depositing the measuring element on a steel substrate;
   depositing an insulating layer on the steel substrate;
   depositing the NiCr(Si) layer;
   patterning the NiCr(Si) layer; and
   performing an annealing operation.
3. The method as recited in claim 1, wherein the at least partial crystallization of the NiCr(Si) layer is implemented during an annealing operation.
4. The method as recited in claim 2, further comprising at least one of:
   depositing an $SiO_x$ layer on the steel substrate as insulation;
   depositing the NiCr(Si) layer by a sputtering process;
   patterning the NiCr(Si) layer by a photochemical operation; and
   performing at least one annealing operation for ageing the measuring element.
5. The method as recited in claim 1, wherein:
   the measuring element includes at least partially a metallic resistance layer,
   the metallic resistance layer is produced by a sputtering process, and
   after production of the metallic resistance layer, an electrical contacting of the metallic resistance layer and a passivation of the metallic resistance layer are implemented by a nitride layer, and
   the metallic resistance layer includes the NiCr(Si) layer.
6. The method as recited in claim 1, further comprising:
   performing an annealing operation at a temperature of T>350° C. to produce the micromechanical pressure sensor, the annealing operation including at least one of:
   causing the partial crystallization to occur at a temperature of between 350 and 450° C., and
   performing the annealing operation one of after a patterning of the NiCr(Si) layer and after passivation of a resistance layer.
7. A micromechanical pressure sensor, comprising:
   a membrane; and
   a measuring element situated on the membrane, the measuring element generating a measured variable by at least one of elastic elongation and compression representing at least one of a pressure applied at the membrane and a pressure differential applied at different sides of the membrane, wherein:
   the measuring element includes at least partially an NiCr(Si) layer, and
   the NiCr(Si) layer is crystallized at least partially.
8. The pressure sensor as recited in claim 7, further comprising:
   a steel substrate on which the measuring element is situated;
   an insulating layer including an $SiO_x$ layer and provided on the steel substrate; and
   a patterned NiCr(Si) layer.
9. The pressure sensor as recited in claim 7, wherein:
   the measuring element at least partially includes a resistance layer,
   the resistance layer includes at least one of a metallic component, an electrical contacting of the resistance layer, and a passivation by a nitride layer.
10. The pressure sensor as recited in claim 7, wherein an offset of a measured variable with respect to an electrostatic discharge remains virtually stable.

* * * * *